(12) United States Patent
Kalakodimi et al.

(10) Patent No.: US 11,746,294 B2
(45) Date of Patent: Sep. 5, 2023

(54) CORROSION CONTROL USING ORGANIC FILMERS AND PASSIVATORS IN SYSTEMS FOR PROCESSING NITROGEN-CONTAINING SOLUTIONS

(71) Applicant: CHEMTREAT, INC., Glen Allen, VA (US)

(72) Inventors: Rajendra Prasad Kalakodimi, Glen Allen, VA (US); Santanu Banerjee, Glen Allen, VA (US); Jared Andrew Green, Owasso, OK (US)

(73) Assignee: ChemTreat, Inc., Glen Allen, VA (US)

( * ) Notice: Subject to any disclaimer, the term of this patent is extended or adjusted under 35 U.S.C. 154(b) by 35 days.

(21) Appl. No.: 17/334,351

(22) Filed: May 28, 2021

(65) Prior Publication Data
US 2022/0389315 A1 Dec. 8, 2022

(51) Int. Cl.
| | |
|---|---|
| *C23F 11/18* | (2006.01) |
| *C23F 11/167* | (2006.01) |
| *C23F 11/12* | (2006.01) |
| *C09K 15/06* | (2006.01) |
| *C09K 15/02* | (2006.01) |

(52) U.S. Cl.
CPC .............. *C09K 15/06* (2013.01); *C09K 15/02* (2013.01); *C23F 11/124* (2013.01); *C23F 11/167* (2013.01); *C23F 11/184* (2013.01); *C23F 11/185* (2013.01)

(58) Field of Classification Search
CPC ......... C23F 11/04; C23F 11/10; C23F 11/163; C23F 11/167; C23F 11/1673; C23F 11/1676; C23F 11/173; C23F 11/18; C23F 11/184; C23F 11/185; C23F 11/187; C23F 11/188; C09K 15/02; C09K 15/06; C09K 15/32
See application file for complete search history.

(56) References Cited

U.S. PATENT DOCUMENTS

| | | | | |
|---|---|---|---|---|
| 3,024,100 | A * | 3/1962 | Langguth | C23F 11/187 |
| | | | | 252/387 |
| 5,376,159 | A * | 12/1994 | Cunningham | C23F 11/185 |
| | | | | 252/389.54 |
| 5,704,961 | A * | 1/1998 | Hudson | C23F 11/126 |
| | | | | 252/387 |
| 6,277,302 | B1 * | 8/2001 | Fan | C23F 11/173 |
| | | | | 252/389.52 |
| 6,814,930 | B1 | 11/2004 | Oldsberg et al. | |
| 6,953,537 | B2 * | 10/2005 | Trahan | C23F 11/188 |
| | | | | 252/389.22 |
| 7,674,312 | B2 * | 3/2010 | Evans | C05G 3/50 |
| | | | | 71/64.1 |
| 7,968,007 | B2 * | 6/2011 | Myers | C23F 11/185 |
| | | | | 252/387 |
| 10,214,459 | B2 * | 2/2019 | Kalakodimi | C05G 3/00 |
| 2004/0035162 | A1 * | 2/2004 | Williams | C05D 9/00 |
| | | | | 71/28 |
| 2008/0083435 | A1 * | 4/2008 | Myers | C05C 1/00 |
| | | | | 134/42 |
| 2011/0111212 | A1 | 5/2011 | Borovik et al. | |
| 2015/0313212 | A1 * | 11/2015 | Alexander | C05C 9/00 |
| | | | | 504/144 |
| 2017/0130340 | A1 * | 5/2017 | Kalakodimi | C23F 11/08 |
| 2018/0274105 | A1 * | 9/2018 | Felipe | C23F 11/167 |
| 2020/0095685 | A1 | 3/2020 | Han et al. | |

FOREIGN PATENT DOCUMENTS

EP          3725756 A2 * 10/2020 ............... C05C 9/02

OTHER PUBLICATIONS

Nalco UAN Fertilizer Corrosion Management Fluid Technology Roundup PowerPoint Presentation (Year: 2013).*
NITROSolveTM 220 SDS (Year: 2018).*

* cited by examiner

Primary Examiner — Matthew R Diaz
(74) Attorney, Agent, or Firm — OLIFF PLC

(57) ABSTRACT

Methods and compositions for inhibiting corrosion of a corrodible metal surface that contact a nitrogen-containing solution. The method comprises adding a chemical treatment composition to the nitrogen-containing solution that includes an organic filmer and a passivator. The organic filmer may be a hydroxycarboxylic acid. The chemical treatment composition may further include a surface-active compound.

13 Claims, 3 Drawing Sheets

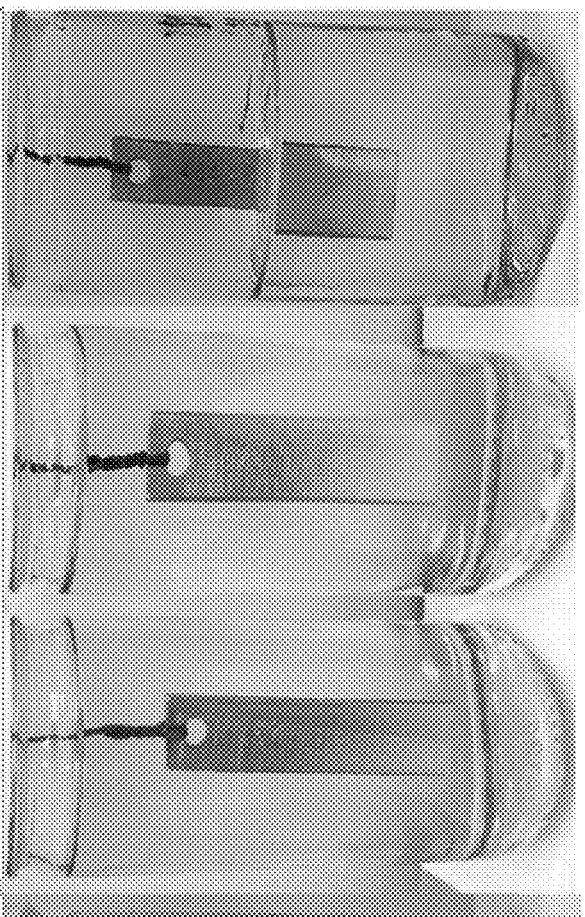
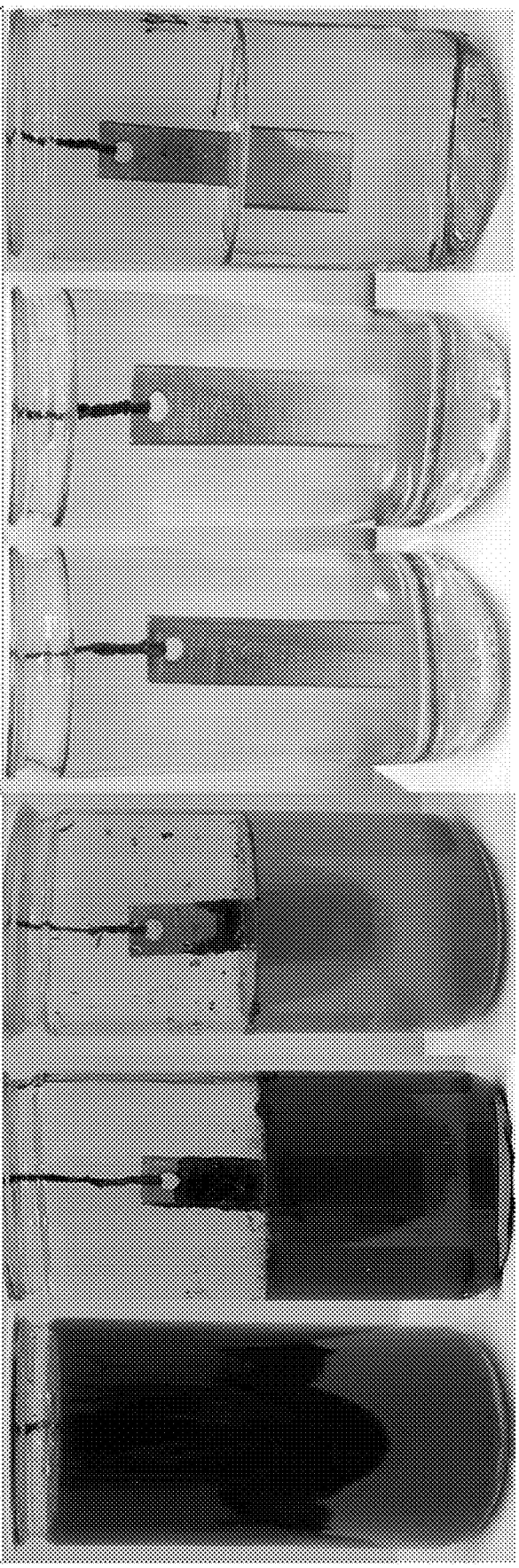

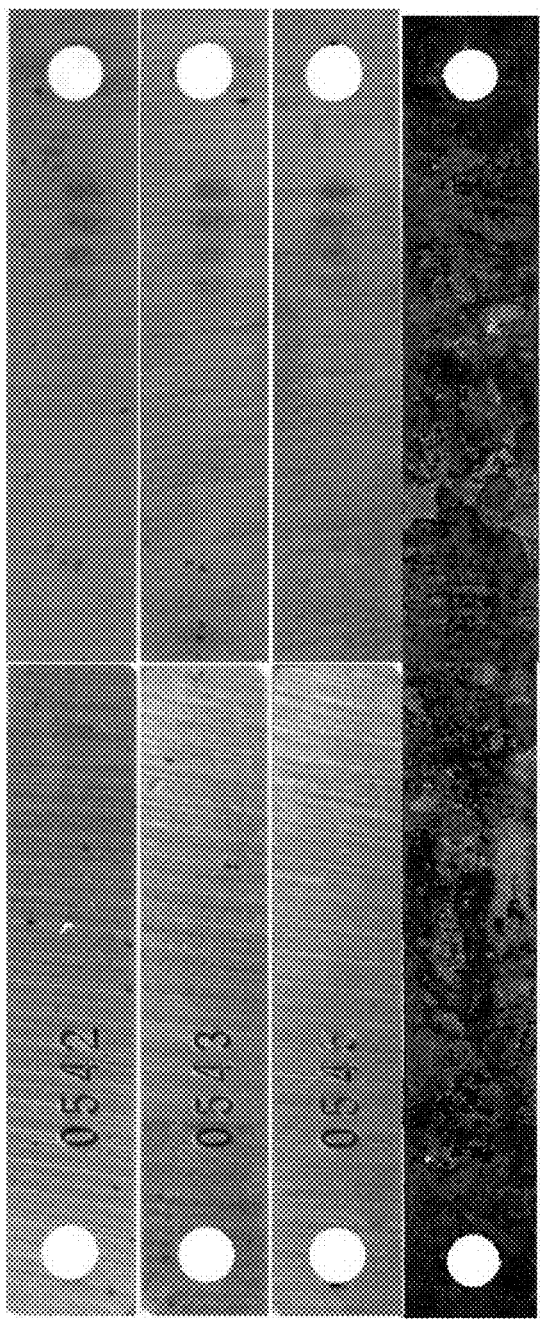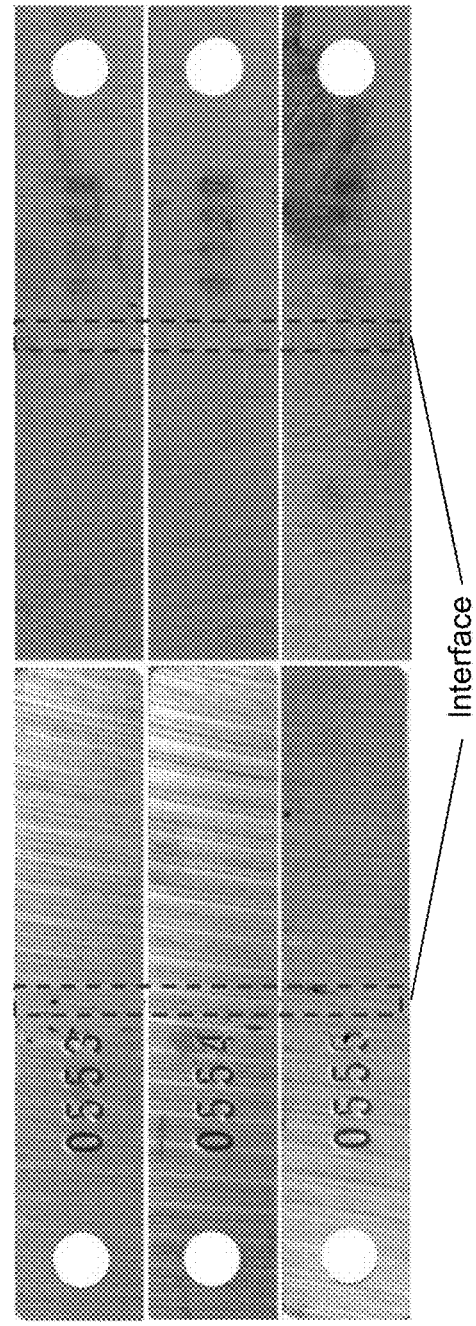
FIG. 2A  FIG. 2B  FIG. 2C  FIG. 2D  FIG. 3A  FIG. 3B  FIG. 3C

CORROSION CONTROL USING ORGANIC FILMERS AND PASSIVATORS IN SYSTEMS FOR PROCESSING NITROGEN-CONTAINING SOLUTIONS

TECHNICAL FIELD

This application is directed to methods for corrosion inhibitor treatment in systems for processing nitrogen-containing solutions, such as fertilizer solutions.

BACKGROUND

Corrosion in systems for processing nitrogen-containing solutions is a serious problem. It causes undesirable consequences, including increased cleaning frequency, equipment repairs, replacements, shutdowns, environmental problems, and the increasing resources and costs associated with each of the above.

Equipment in systems for processing nitrogen-containing solutions, such as fertilizer solutions, is particularly vulnerable to corrosion because it is exposed to concentrated aqueous fertilizer solutions containing nitrogen compounds during operation, storage, and transport. The fertilizer solutions most commonly come in the form of urea ammonium nitrate (UAN) and ammonium nitrate (AN) liquid fertilizers which are produced and sold in large volumes for application to agricultural crops. Free ammonia in high concentrations is undesirable because it is harmful to vegetation and causes unpleasant ammonia vapors. Accordingly, these solutions are typically produced and sold at low pH values (e.g., less than 7.5) to minimize free ammonia. The solutions are often transported and stored in steel tanks, which corrode very rapidly in the presence of the UAN or AN if no corrosion inhibitor is present.

Moreover, as the storage tanks are not always completely full, providing necessary corrosion protection at the metal/fertilizer interface is critical. Conventionally, inhibitors such as ammonium phosphates, sulfated organic acids, organic phosphate esters, sodium molybdate solutions, and tungstates have been used. Several problems have been encountered with these inhibitors, including inadequate corrosion protection resulting in costly repair or replacement of equipment. Additionally, conventional organic-based inhibitors tend to separate from the fertilizer solution resulting in loss of corrosion protection as the solution is transferred during its distribution, which results in the formation of an undesirable surface layer and/or a sludge or sediment which can also contain corrosion products, and which if deposited on vessel surfaces can cause pitting corrosion. Another problem encountered with conventional organic-based inhibitors is excessive foaming, which makes application of the fertilizer difficult, and when solutions are transferred during distribution, undesirably releases the solutions into the environment.

Thus, there is a need for corrosion inhibitors that are effective in the manufacture, distribution, and operation of fertilizers, while being non-toxic and biodegradable to reduce environmental impact. These and other issues are addressed by the present disclosure.

SUMMARY

It is an object of this disclosure to provide methods and compositions for inhibiting corrosion of metal surfaces in nitrogen-containing solutions, and particularly UAN or AN solutions, which overcome the problems with conventional methods of treatment. In some aspects, the disclosed methods and compositions can provide superior corrosion inhibition using inhibitors that are adequately soluble in the UAN and AN solutions and that do not separate, are stable, are low foaming, and do not present toxicity problems. The disclosed methods and compositions can provide superior corrosion protection for steel surfaces.

In a first embodiment, there is provided a method of inhibiting corrosion of a corrodible metal surface that contacts a nitrogen-containing solution. The method comprises adding a chemical treatment composition to the nitrogen-containing solution that includes an organic filmer and a passivator.

In another embodiment, there is provided a chemical treatment composition suitable for inhibiting corrosion of a corrodible metal surface that contacts a nitrogen-containing solution including in a range of 28 to 34% by wt % of elemental nitrogen. The composition comprises a hydroxy-carboxylic acid organic filmer, a passivator, and a surface-active compound. The organic filmer is present in an amount in a range of 0.01 to 10 wt %, the passivator is present in an amount in a range of 0.1 to 40 wt %, and the surface-active compound is present in an amount in a range of 0.1 to 40 wt %

BRIEF DESCRIPTION OF THE DRAWINGS

FIGS. 1A and 1B are photographs comparing mild steel coupon samples with no treatment (FIG. 1A) to samples treated with a UAN corrosion inhibitor according to an embodiment (FIG. 1B).

FIGS. 2A, 2B, 2C, and 2D are photographs showing mild steel coupon samples that have been treated with various concentrations of UAN corrosion inhibitor treatment according to embodiments (FIGS. 2A, 2B, and 2C) and no UAN treatment (FIG. 2D).

FIGS. 3A, 3B, and 3C are photographs showing mild steel coupon samples that have been treated with various concentrations of UAN corrosion inhibitor treatment according to embodiments and then subjected to an interface test.

DETAILED DESCRIPTION

Figures 4A, 4B:
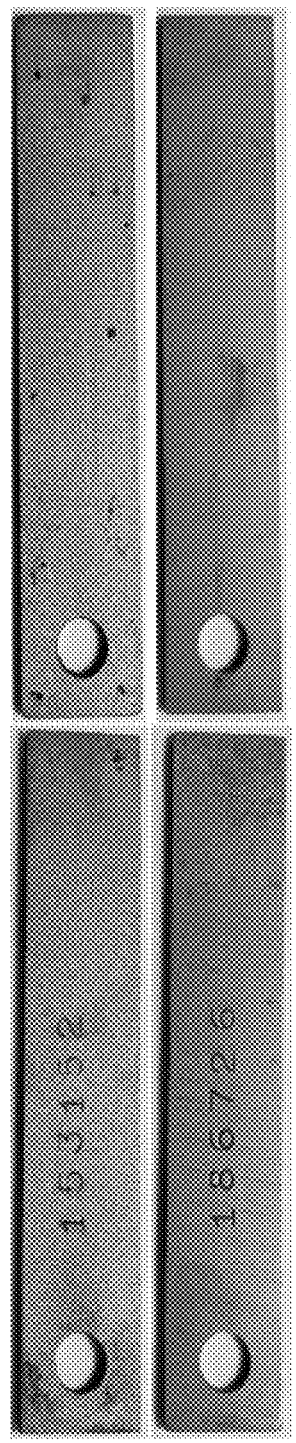
FIGS. 4A and 4B are photographs showing mild steel coupon samples that have been treated with various concentrations of AN corrosion inhibitor treatment according to embodiments.

Nitrogen-containing solutions are highly corrosive due, in part, to their low pH, which present very aggressive corrosion conditions. Nitrogen-containing solutions according to embodiments may include any suitable amount of nitrogen for the specific purpose served. For example, the solutions may include in a range of 1 to 99%, 5 to 90%, 10 to 80%, 15 to 70%, 20 to 50%, or 25 to 40% of elemental nitrogen. The remainder being water and, optionally, other additives. In terms of water, the solutions may include in a range of 1 to 99%, 5 to 90%, 10 to 80%, 15 to 70%, 20 to 50%, or 25 to 40%. The solutions are usually produced and sold at relatively low pH values to minimize the content of free ammonia. In embodiments, the pH values of the solutions may be in a range of 3.5 to 8, 4 to 7.5, 5 to 7, 6 to 7, or 6.5 to 7. Nitrogen-containing solutions may also contain other nutrients or treatment chemicals.

UAN and AN fertilizers are types of nitrogen-containing solutions. These fertilizers typically include ammonium nitrate, urea, and water as main components. Such nitrogen compounds commonly include ammonia, ammonium salts such as ammonium nitrate, ammonium sulfate, and ammonium phosphate, nitrates such as potassium nitrate, and sodium nitrate, and organic nitrogen-based compounds such as urea and ammonium carbamate, and mixtures thereof.

In terms of ammonium nitrate, UAN fertilizers typically include in a range of 10 to 50%, 20 to 40%, 25 to 35%, or 28 to 34%. In terms of urea, the UAN fertilizers may include in a range of 20 to 50%, 20 to 40%, 25 to 35%, or 30 to 35%. In terms of water, the UAN fertilizers may include in a range of 10 to 50%, 15 to 40%, 20 to 35%, or 20 to 30%. The pH values may be in a range of 3.5 to 8, 4 to 7.5, 5 to 7, 6 to 7, or 6.5 to 7.

Conventional inhibitors are simply ineffective under the harsh conditions of such nitrogen-containing solutions. In this regard, the pH environment is too corrosive and the solutions are too aggressive with ammonium nitrate being highly corrosive on metal surfaces. Embodiments of the disclosed methods and compositions apply the discovery of improved corrosion inhibition to systems for processing nitrogen-containing solutions. In embodiments, such systems may include, but are not limited to storage tanks, fertilizer distribution systems, pipelines, and the like. Embodiments of the methods and compositions are particularly useful with storage tanks in industrial fertilizing processes.

According to disclosed methods, improved corrosion inhibition can be achieved at lower cost and with less environmental impact by treating fertilizer systems with a corrosion inhibitor, such as an organic filmer, together with a passivator and, optionally, a surface-active agent. Disclosed embodiments form a very tenacious and persistent inhibitor film on the surface of corrodible metal by treatment with a chemical treatment composition including the organic filmer together with the passivator.

[The Chemical Treatment Composition]

The chemical treatment composition is a synergistic combination of corrosion inhibitors, such as organic filmers, and passivators, which provides for surprisingly effective corrosion protection. Without intending to be bound by theory, it is believed that aliphatic moieties render the organic filmers surface active in the nitrogen-containing solutions so that they form a molecular film on metal surfaces, and the anionic moieties provide corrosion protection for the metal, e.g., steel, surfaces.

In addition to providing a protective film in of themselves, organic filmers act as a stabilizer for the passivator or as a carrier for passivators to the metal surface. In this regard, negatively charged functional groups of the filmers and positive charges on the metal surface result in chemical and physical absorption. Passivators form thin protective layers on metal surfaces that reduce chemical activity with air and water or other material that comes into contact with the surface. The passivators form a metal oxide bond that enhances the corrosion inhibition of the organic filmers by forming a thin transparent oxide coating.

The chemical treatment composition may be an aqueous composition that is fed into the nitrogen-containing solution. The organic filmer may be present in the composition in an amount in the range of 1 to 90 wt %, 5 to 75 wt %, 15 to 60 wt %, 25 to 50 wt %, or 30 to 40 wt %. The organic filmer may be present in the nitrogen-containing solution in the range of 1 to 250 ppm, 1 to 150 ppm, 1 to 90 ppm, 10 to 75 ppm, or 25 to 50 ppm. The passivator may be present in the composition in an amount in the range of 1 to 90 wt %, 5 to 75 wt %, 15 to 60 wt %, 25 to 50 wt %, or 30 to 40 wt %. The passivator may be present in the nitrogen-containing solution in the range of 1 to 250 ppm, 1 to 150 ppm, 1 to 90 ppm, 10 to 75 ppm, and 25 to 50 ppm. The organic filmer and passivator together may be present in the nitrogen-containing solution in the combined range of 1 to 500 ppm, 1 to 300 ppm, 1 to 200 ppm, 10 to 150 ppm, 50 to 150 ppm, and 100 to 150 ppm. A ratio of a concentration of the organic filmer in the nitrogen-containing solution in terms of ppm to a concentration of the passivator in the solution in terms of ppm is in the range of 1:10 to 10:1, 0.5:5 to 5:0.5, 0.75:3 to 3:0.75, or may be 1:1 or 1.15:1.

Organic filmers suitable for use with the disclosed methods include carboxylic acids or their water-soluble salts, or mixtures thereof. Examples include, but are not limited to, tartaric acid, glucaric acid, maleic acid, gluconic acid, aspartic acid, and succinic acid. Hydroxycarboxylic acids are particularly suitable. Hydroxycarboxylic acids are carboxylic acids substituted with a hydroxyl group on adjacent carbon moieties. Hydroxycarboxylic acids are well known organic compounds applied in various applications. Examples include, but are not limited to, tartaric acid, glycolic acid, and maleic acid. In embodiments, the corrosion inhibitor may be a polymeric hydroxycarboxylic acid. For example, in preferred embodiments, the corrosion inhibitor may be polymaleic acid (PMA).

In embodiments, the passivators may be inorganic or organic passivators. Examples of inorganic passivators include, but are not limited to, phosphates, nitrates, and zinc. Examples of inorganic passivators include, but are not limited to, citric acid. Passivators may also include ammonium phosphates, sulfated organic acids, organic phosphate esters, sodium molybdate solutions, and tungstates. In embodiments, the passivator may be an organophosphorus compound or phosphorous molybdate.

The chemical treatment composition may further include surface-active agents that further enhance the disclosed chemical treatment composition. Surfactants help ready the metal surface to function, and have inherent surface active properties. The surface-active agent may be present in the composition in an amount in the range of 1 to 90 wt %, 5 to 75 wt %, 15 to 60 wt %, 25 to 50 wt %, or 30 to 40 wt %. The surface-active agent may be present in the nitrogen-containing solution in the range of 1 to 90 ppm, 10 to 75 ppm, and 25 to 50 ppm. A ratio of a concentration of the organic filmer in the nitrogen-containing solution in terms of ppm to a concentration of the surface-active agent in the solution in terms of ppm is in the range of 1:10 to 10:1, 0.5:5 to 5:0.5, 0.75:3 to 3:0.75, or may be 1:1.

Surface-active agents suitable for use with the disclosed methods include, but are not limited to, nonionic surfactants. Nonionic surfactants improve wettability of the chemical treatment composition on the surface of the corrodible metal surface. The nonionic surfactant has a hydrophilic portion and a hydrophobic portion. Accordingly, the addition of the nonionic surfactant to the treatment composition makes the treatment composition less likely to be repelled even from a base metal having a highly hydrophobic surface. Furthermore, the nonionic surfactant does not materially change the pH of the treatment composition. Accordingly, the addition of the nonionic surfactant to the treatment composition does not cause unintentional precipitations in the treatment composition.

Examples of nonionic surfactants include, include but are not limited to, esters, ethers, alkylglycosides, octylphenol ethoxylates, 1-methyl-2-pyrrolidone ($C_4H_7NO$), and polyhydric alcohols. The chemical treatment composition may contain any one or two or more of these nonionic surfactants. In preferred embodiments, the nonionic surfactant is an ester. Examples of the esters include, but are not limited to, glycerin fatty acid esters (such as glycerin stearic acid ester and glycerin lauric acid ester), sorbitan fatty acid esters (such as sorbitan lauric acid ester, sorbitan palmitic acid ester, sorbitan stearic acid ester, and sorbitan oleic acid ester), and sucrose fatty acid esters (such as sucrose lauric acid ester, sucrose stearic acid ester, sucrose palmitic acid ester, and sucrose oleic acid ester).

[Treatment Methods]

Disclosed treatment methods and compositions result in synergistic corrosion inhibition and a significant reduction in the amount of organic filmer and passivator required, which is beneficial for the environment and reduces the cost of treatment. The methods provide for more economical treatment of specialized large volume systems, which pose a significant challenge for dosage and control using conventional anti-corrosion treatments. The methods also greatly reduce the amount of organic filmer and passivator required to protect the treated system.

To facilitate dispersion, the chemical treatment composition may be added to the nitrogen-containing solution as a water soluble salt. If adequate mixing is provided, it may also be added as a free acid which forms a salt at the pH values of the nitrogen-containing solution, and thus disperses in and does not separate from the solution.

In embodiments, there is provided a method of inhibiting corrosion of a corrodible metal surface that contacts a nitrogen-containing solution. The method includes adding a chemical treatment composition to the solution that includes an organic filmer and passivator. The treatment composition is provided in a sufficient amount and for a sufficient time to form a stable protective film on at least a portion of the corrodible metal surface.

The corrodible metal surface may be a metal or alloy selected from the group consisting of ferrous metals, aluminum metals, brass, copper containing alloys, mild steels, carbon steels, and galvanized steels. The metal surface may be mild steel or stainless steel.

The method and manner by which the chemical treatment composition is fed into the nitrogen-containing solution is not particularly limited by this disclosure. Treatment can be infused into the solution in the storage tank, for example, or any suitable location of the solution during the fertilization cycle. Methods for feeding the treatment composition, including controlling the flow of the feed, may include a multi-valve system or the like, as would be understood by one of ordinary skill in the art. Moreover control of the treatment while in the system is not particularly limited. Feed control, including frequency, duration, concentrations, dosing amounts, dosing types and the like, may be controlled manually or automatically through, for example, an algorithm or a computer executable medium, such as a CPU. These controls may further be implemented with data and history-driven learning capabilities and feedback loops for automatically adapting treatment regimens to system and metallic surface environmental conditions. The treatment can be continuous, intermittent or periodic. The corrosion inhibitor can be added to the solution apart from the surface-active agent, or each can be added simultaneously.

If desired, additional corrosion inhibition and/or treatment chemistry known in the art can be introduced into the system in conjunction with the combination feeding to further improve corrosion performance and control deposition of undesirable species. As will be appreciated, the treatment methods according to the disclosure can be paired with other treatment or conditioning chemistries that would be compromised by the continuous presence of the corrosion inhibitor. Alternatively, "greener" treatment packages or treatment packages designed to address other parameters of the system operation can be utilized between the intermittent feedings to improve the quality of the system effluent and/or reduce the need for effluent treatment prior to discharge.

In another embodiment, there is provided a chemical treatment composition suitable for inhibiting corrosion of a corrodible metal surface that contacts a nitrogen-containing solution containing from about 28 to 34% by weight of elemental nitrogen. The composition includes a hydroxycarboxylic acid organic filmer, a passivator, and a surface-active compound. The composition can be an aqueous composition that is fed into the solution.

In embodiments, the treatment composition may be introduced into open or closed fertilizer systems. Further, the treatment can be applied to the solution while the system is on-line. Alternatively, the treatment composition may be introduced into the solution while the system is offline such as during pre-treating the corrodible metal surface before the equipment is brought into service in the fertilizer system.

EXAMPLES

The following Examples illustrate applications of the treatment methods and compositions disclosed herein.

Experiment I

Mild steel coupons were submerged in a UAN solution inside bottles for 30 days. Coupons with no UAN inhibitor treatment (FIG. 1A) were compared to coupons that had been treated with UAN inhibitor according to disclosed embodiments (FIG. 1B) including a phosphorous molybdate passivator and a hydroxycarboxylic acid organic filmer at a concentration ratio of 1.15:1 in the solution. As seen in the photographs of FIG. 1A, the coupons that received no treatment exhibited significant corrosion compared to coupons that received the UAN inhibitor treatment. Almost no corrosion was observed in the coupons that received the UAN inhibitor treatment, as seen in the photographs of FIG. 1B.

Experiment II

Mild steel coupons were treated with various dose rates of ChemTreat's UAN inhibitor including phosphorous molybdate passivator only (Examples 1-3) and phosphorous molybdate passivator and hydroxycarboxylic acid filmer combined (Examples 4-6) and fully submerged in bottles including UAN solution ($UAN_{32}$) for 30 days. Comparative Example 1 tested a mild steel coupon under the same conditions with no UAN inhibitor treatment. The results are summarized in Table 1 below.

| Example | Inhibitor | Application Dosage in Solution (ppm) | Passivator/ Filmer Ratio | Test Duration (days) | Coupon Corrosion rate (mpy) | Coupon Image | Formulation Stability | Foaming tendency | Comment |
|---|---|---|---|---|---|---|---|---|---|
| Example 1 | Passivator only | 50 | — | 30 | 0.263 | — | Stable | None | Low pitting/general corrosion |
| Example 2 | Passivator only | 100 | — | 30 | 0.24 | — | Stable | None | Low pitting/general corrosion |
| Example 3 | Passivator only | 150 | — | 30 | 0.267 | — | Stable | None | Low pitting/general corrosion |
| Example 4 | Passivator + Filmer | 50 | 1.15:1 | 30 | 0.178 | FIG. 2A | Stable | None | Low pitting/general corrosion |
| Example 5 | Passivator + Filmer | 100 | 1.15:1 | 30 | 0.161 | FIG. 2B | Stable | None | Low pitting/general corrosion |
| Example 6 | Passivator + Filmer | 150 | 1.15:1 | 30 | 0.188 | FIG. 2C | Stable | None | Low pitting/general corrosion |
| Comparative Example 1 | No treatment (control) | 0 | — | 30 | >20 | FIG. 2D | — | — | High pitting/high corrosion |

As seen in Table 1, treatment with UAN inhibitor treatment (Examples 1-6) resulted in significantly reduced corrosion compared to the control sample (Comparative Example 1). In particular, the corrosion rate of Examples 1-6 ranged from 0.161 to 0.267 mpy compared to greater than 20 mpy for Comparative Example 1. Additionally, treatment with the UAN inhibitor treatment including the passivator and organic filmer according to embodiments (Examples 4-6) exhibited even better corrosion rates (0.161 to 0.188) compared to the UAN inhibitor treatment including the passivator only without organic filmer (Examples 1-3) (0.24 to 0.267). Photographs of Examples 4, 5, and 6 are shown in FIGS. 2A, 2B, and 2C, respectively. These photographs confirm that almost no pitting or corrosion was observed for these samples.

Experiment III

Mild steel coupons were treated with various dose rates of ChemTreat's UAN inhibitor including passivator and organic filmer combined (Examples 7-9), corresponding to Examples 4-6, and fully submerged in bottles including UAN solution ($UAN_{32}$) for 30 days. The results in observed in Experiment II are confirmed here by interface testing of Examples 7-9 shown in the photographs of FIG. 3A (Example 7), FIG. 3B (Example 8), and FIG. 3C (Example 9), which illustrate almost no pitting or corrosion at the UAN solution interface.

Experiment IV

Mild steel coupons were treated with various dose rates of ChemTreat's AN inhibitor including a phosphorous molybdate passivator only (Examples 10-12) and a phosphorous molybdate passivator and hydroxycarboxylic acid organic filmer combined (Examples 13-15) and fully submerged in bottles including AN solution for 30 days. The results are summarized in Table 2 below.

| Example | Inhibitor | Application Dosage in Solution (ppm) | Passivator/ Filmer Ratio | Test Duration (days) | Coupon Corrosion rate (mpy) | Coupon Image |
|---|---|---|---|---|---|---|
| Example 10 | Passivator only | 50 | — | 7 | 8.25 | — |
| Example 11 | Passivator only | 100 | — | 7 | 5.915 | — |
| Example 12 | Passivator only | 150 | — | 7 | 1.548 | — |
| Example 13 | Passivator + Filmer | 50 | 1.15:1 | 7 | 3.112 | — |
| Example 14 | Passivator + Filmer | 100 | 1.15:1 | 7 | 0.257 | FIG. 4A |
| Example 15 | Passivator + Filmer | 150 | 1.15:1 | 7 | 0.099 | FIG. 4B |

As seen in Table 2, treatment with 150 ppm of passivator-only AN inhibitor treatment (Example 12) and 100 to 150 ppm passivator plus organic filmer AN inhibitor treatment (Examples 14 and 15) resulted in significantly reduced corrosion compared to Examples 10 and 11 (50 ppm and 100 ppm passivator-only AN inhibitor treatment, respectively) and Example 13 (passivator plus organic filmer AN inhibitor treatment). In particular, the corrosion rate of Examples 12, 14, and 15 ranged from 0.099 to 1.548 mpy compared to greater than 3.112 mpy for Examples 10, 11, and 13. Additionally, treatment with the AN inhibitor treatment including the passivator plus organic filmer according to embodiments (Examples 13-15) exhibited better corrosion rates (0.099 to 3.112) compared to the corresponding ppm AN inhibitor treatments including the passivator only (Examples 10-12) (1.548 to 8.25). Photographs of Examples 14 and 15 are shown in FIGS. 4A and 4B, respectively. These photographs confirm that almost no pitting or corrosion was observed for these samples.

The above results clearly show that the UAN treatment according to disclosed embodiments provides surprising corrosion inhibition properties and results in better corrosion rates than the control groups with no UAN treatment. The above results show that UAN and AN treatment including passivator plus organic filmer according to embodiments results in better corrosion inhibition properties than UAN and AN treatment including passivator only. The above results also show that AN treatment at higher concentrations outperforms treatments at lower concentrations.

It will be appreciated that the above-disclosed features and functions, or alternatives thereof, may be desirably combined into different systems or methods. Also, various alternatives, modifications, variations or improvements may be subsequently made by those skilled in the art, and are also intended to be encompassed by the disclosed embodiments. As such, various changes may be made without departing from the spirit and scope of this disclosure.

What is claimed is:

1. A method of inhibiting corrosion of a corrodible metal surface that contacts a nitrogen-containing solution including elemental nitrogen in a range of 28 to 34% by wt %, the method comprising:

adding a chemical treatment composition to the nitrogen-containing solution that includes an organic filmer and a passivator, wherein the organic filmer includes a hydroxycarboxylic acid selected from the group consisting of tartaric acid and glycolic acid, and the treatment composition is provided in a sufficient amount and for a sufficient time to form a stable protective film on at least a portion of the corrodible metal surface.

2. The method of inhibiting corrosion according to claim 1, wherein the passivator is an organophosphorus compound or phosphorous molybdate.

3. The method of inhibiting corrosion according to claim 1, wherein the chemical treatment composition further includes a surface-active compound.

4. The method of inhibiting corrosion according to claim 3, wherein the surface-active compound is a nonionic surfactant.

5. The method of inhibiting corrosion according to claim 4, wherein the nonionic surfactant is an ester.

6. The method of inhibiting corrosion according to claim 1, wherein the treatment composition is added so that a concentration of the organic filmer in the nitrogen-containing solution is in a range of 1 ppm to 90 ppm.

7. The method of inhibiting corrosion according to claim 1, wherein the treatment composition is added so that a concentration of the organic filmer in the nitrogen-containing solution is in a range of 25 ppm to 50 ppm.

8. The method of inhibiting corrosion according to claim 1, wherein the treatment composition is added so that a concentration of the passivator in the nitrogen-containing solution is in a range of 1 ppm to 90 ppm.

9. The method of inhibiting corrosion according to claim 1, wherein the treatment composition is added so that a concentration of the passivator in the nitrogen-containing solution is in a range of 25 ppm to 50 ppm.

10. The method of inhibiting corrosion according to claim 3, wherein the treatment composition is added so that a concentration of the surface-active compound in the nitrogen-containing solution is in a range of 1 ppm to 90 ppm.

11. The method of inhibiting corrosion according to claim 1, wherein the treatment composition is added so that a concentration of the surface-active compound in the nitrogen-containing solution is in a range of 25 ppm to 50 ppm.

12. The method of inhibiting corrosion according to claim 1, wherein the treatment composition is added so that a combined concentration of the organic filmer and the passivator in the nitrogen-containing solution is in a range of 50 to 150 ppm.

13. The method of inhibiting corrosion according to claim 1, wherein a ratio of a concentration of the organic filmer in the nitrogen-containing solution in terms of ppm to a concentration of the passivator in the nitrogen-containing solution in terms of ppm is in a range of 1:10 to 10:1.

* * * * *